Sept. 2, 1958 R. G. O'FALLON 2,850,678

COLOR TELEVISION RECEIVER

Filed May 3, 1955

INVENTOR.
Richard G. O'Fallon
BY
Mueller & Aichele
Attys 2,850,678
Patented Sept. 2, 1958

2,850,678

COLOR TELEVISION RECEIVER

Richard G. O'Fallon, Westchester, Ill., assignor to Motorola, Inc., Chicago, Ill., a corporation of Illinois Application May 3, 1955, Serial No. 505,673

6 Claims. (Cl. 315—27)

This invention relates to color television receivers and more specifically to beam deflection apparatus for a tri-beam cathode ray tube used in such a receiver.

In a common type of color television receiver, an image reproducing tube is used wherein three electron beams are scanned across a screen composed of triad groups of phosphor dots. Each electron beam is separately modulated according to components of the received signal and represents a primary color so that the beam may impinge upon a particular dot in the triad which produces the primary color. The energized triad then appears to the eye as an element of a picture having a color determined by the combination of the primary colors produced by the three phosphor dots. The beams, synchronized by the received signal, sequentially scan the triad groups to form a complete picture image which is rapidly repeated also in synchronism with the received signal. It is usual to provide an apertured shadow mask in front of the triad groups on the beam side of the screen and to converge the electron beams in the plane of the mask so that they pass through the apertures and impinge only on the proper phosphor dots as they are deflected across the screen.

Horizontal or line scanning of the beams is generally accomplished by applying a suitable control signal to the coils of a deflection yoke, to produce properly oriented variable magnetic fields which cause the desired deflection of the beams. Vertical scanning of the beams is similarly obtained by application of a field deflection signal to additional coils on the yoke to produce appropriate field deflection variable magnetic fields.

It is usual, during initial adjustment of the television receiver, to position the deflection yoke on the tube neck, through which the beams pass, so that the three electron beams impinge upon the centers of phosphor dots at the extreme top, bottom and sides of the screen. That is, the yoke may be moved longitudinally along the tube neck, thus slightly changing the angle at which the beams leave the yoke in deflection positions from a "deflection center," or point within the yoke from which the beams appear to come, until registry upon the dots of the screen is obtained. However, it has been found that with many of the tri-beam cathode ray tube and yoke combinations used at the present time, the position of the yoke on the tube neck which effects registration of the beams on the center of the phosphor dots at the top and bottom of the screen does not give such desired registration at the extreme sides of the screen. Therefore, in the past, the deflection yokes have been located upon the tube neck to give a compromise result which, in some positions of the beams as scanned across the screen, produces misregistration in that one or more of the beams partially strikes the wrong phosphor dot which affects color purity or does not fall entirely upon the intended dot giving insufficient energization of such dot.

Accordingly, an object of this invention is to provide electron beam deflection apparatus which may be located on the neck of a tri-gun color cathode-ray image reproducer in a position to secure registration of the electron beams with the proper phosphor dots on the tube screen throughout all lateral and longitudinal deflected positions of the beams.

Another object is to provide such an electron beam deflection yoke in which the exit angle of the beams from the yoke, or the apparent deflection center of the yoke as a beam emerges from the yoke, for the horizontal deflected positions may be selected independently from the exit angle for the vertical deflected positions of the beams, or, to secure the proper registration of the beams with the color dots in all deflected positions of the beams.

Another object of the invention is to provide such a beam deflection yoke which achieves the object set forth in the preceding paragraph and in which losses are relatively low as compared with prior art yokes of this general type.

A feature of the invention is the provision of an improved beam deflection yoke for a tri-gun reproducer having horizontal and vertical deflection coils with end portions turned away from the electron beam path and having the turns on the opposite ends of one coil spaced unequally from the beam path in order to effect a shift of the deflection center of the horizontal coil with respect to the vertical coil and to change the angle at which the beams emerge from the yoke at horizontal deflected positions independent of the angle at the vertical deflected positions, or, to correct for misregistrations in the tube.

Another feature of the invention is the provision of a deflection yoke having coils for horizontally and vertically deflecting the electron beams in a tri-gun cathode ray tube, which coils are coaxially mounted and of unequal length and longitudinally displaced from one another, thereby shifting the horizontal and vertical deflection centers with respect to one another to correct for misregistrations and also reducing the losses between the respective coils.

Further objects, features and the attending advantages thereof may be appreciated upon consideration of the following description of a specific embodiment of the invention when taken in conjunction with the drawing in which.

In accordance with this invention, there is provided an electron beam deflection yoke adapted to be positioned on the neck of a cathode ray tube and having dual section horizontal and vertical deflection coils to which are applied suitable deflection control signals. These sets of coils develop respective properly oriented variable magnetic deflection fields which scan the three electron beams in a color television image reproducing tube in two directions across a suitable shadow mask and phosphorescent screen, so that the beams when deflected through the horizontal and vertical ranges across the screen may impinge in proper registry upon the intended phosphor dots. The deflection coils are constructed in a manner resulting in a shift or alteration of the vertical deflection center of the yoke independently of the horizontal deflection center. Accordingly, one set of deflection coils has upturned end portions at opposite ends thereof which are spaced differently from the tube neck than corresponding upturned end portions of the other set. A relative shift in the deflection centers may also be effected by forming one set of coils longer than the other set and mounting the sets coaxially but laterally displaced, or with asymmetrical spacing between their respective end portions. This latter expedient also reduces the capacity between the two sets of coils so that losses are lowered and efficiency is increased.

Figure 1:
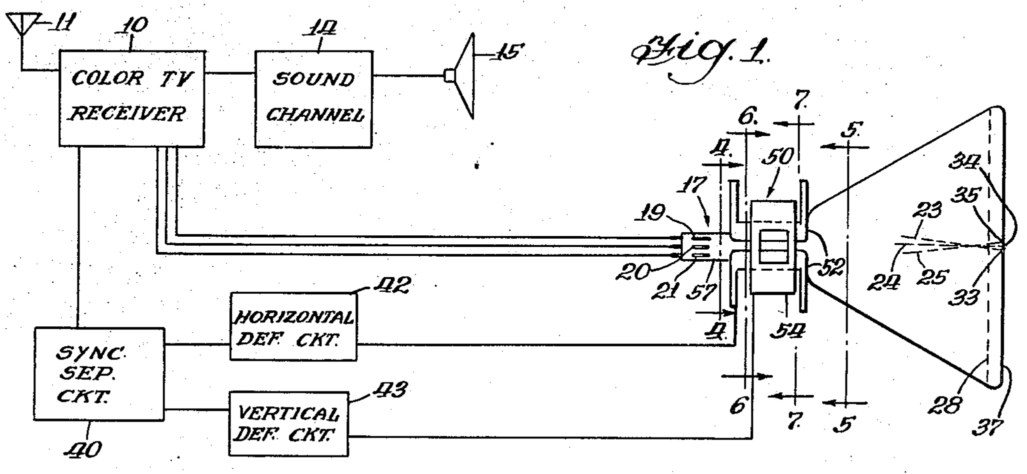
Fig. 1 is a block diagram of a color television receiver illustrating the use of the deflection yoke of the invention.

Referring now to Fig. 1, there is shown a block diagram of a color television receiver 10 which is coupled to a source of signals or antenna 11. The receiver 10 may include conventional circuitry for selecting and amplifying a received color television signal and for separating its components for application to the other circuits represented in Fig. 1. The sound component of the color television signal is applied to the sound channel 14 which detects and amplifies such a signal so that it may be reproduced by speaker 15. Receiver 10 also applies signals to image reproducing device or cathode ray tube 17. As is customary in receivers of this type, signals representing different colors are applied to the electron beam sources 19, 20 and 21. These sources produce electron beams represented by beams 23, 24 and 25, and the beams are directed through apertures in shadow mask 28 at the proper inclinations so that they may impinge upon the correct phosphor dots 33, 34 and 35 of screen 37. As previously pointed out, the phosphor dots constitute a triad, or an element of the completed picture image, having a color determined by the relative excitation of the dots which, in turn, is dependent upon the relative beam intensities as determined by the signals applied to guns 19—21 by receiver 10.

Receiver 10 also provides signals for the sync separator circuit 40 and these signals are utilized to synchronize horizontal deflection circuit 42 and vertical deflection circuit 43 in accordance with the received color television signal. Circuits 42, 43 then apply suitable deflection signals to the deflection yoke 50 which consists of a pair of horizontal deflection coils 52 and a pair of vertical deflection coils 54. Scanning of the electron beams produced by yoke 50 and its associated circuitry, of course, deflects the beams in horizontal and vertical directions upon screen 37 so that a completed picture image is formed by means of the many triads provided on the screen 37.

Figures 2, 3, 7:
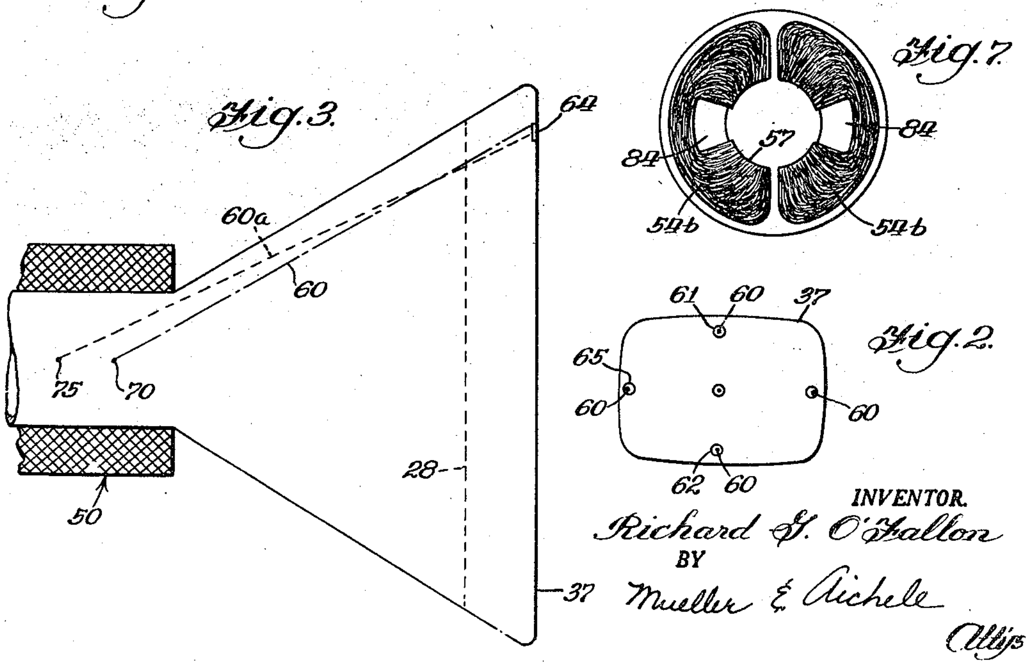
Fig. 2 is a representation of the screen of an image reproducing tube.
Fig. 3 is a diagram useful in explaining the operation of the invention.

As previously mentioned, when the receiver is being initially aligned, the deflection yoke 50 is positioned on neck 57 of tube 17 so that the beams, when deflected to the extreme portions of screen 37, strike the centers of their intended phosphor dots. However, due to manufacturing tolerances and various discrepancies in a given tube and yoke combination, it has been found that a given position of the yoke will not effect the desired registry in both the extreme horizontal and the extreme vertical deflected positions of the beams. For example, as shown in Fig. 2 (greatly out of proportion for purposes of explanation), a given beam 60 may strike the center of its phosphor dots 61 and 62 at extreme top and bottom positions of the screen 37. However, it is common to find that with such proper positioning of the yoke as far as vertical deflection is concerned, the beam 60 strikes the outer edges of phosphor dots 64 and 65 which are at the extreme horizontal positions of screen 37.

Referring now to Fig. 3, there is shown a plan view of the cathode ray tube 17 and a representation of beam 60 traveling through shadow mask 28 to impinge upon phosphor dot 64. It may be seen that beam 60 is illustrated traveling from a point 70 within yoke 50. This is not a true representation of the travel of beam 60 as it passes through the yoke 50 but rather is a representation sometimes used in the art when considering matters of this sort. Point 70 is defined herein as the horizontal deflection center of the yoke 50, and more particularly of the horizontal deflection coils 52 (Fig. 1), and is taken to be the point from which beam 60 would appear to travel as it emerges from the field of influence of yoke 50.

In accordance with this invention, the point 70, or deflection center of the horizontal deflection coil 52, is shifted away from screen 37 to point 75 so that the beam now travels along a path represented by beam 60*a* thus striking the center of phosphor dot 64, and this shift is independent of the deflection center of the vertical deflection coil. This, of course, provides a similar correction for impingement upon phosphor dot 65 on the other part of the screen 37 (Fig. 2) and furnishes greatly improved registry of all the beams upon all the phosphor dots at the various deflected positions of screen 37.

In order to accomplish such shifting of the deflection center, thus somewhat changing the angle at which the beams leave the yoke, the horizontal deflection coils 52 may be extended to the rearward of vertical deflection coils 54 (Fig. 1). That is, the horizontal deflection coils 52 may be made somewhat longer than the vertical deflection coils 54 and these coils are coaxially mounted but asymmetrically disposed along the longitudinal axis of neck 57, so that their corresponding ends are unequally spaced and the geometric centers of the coils do not coincide. Such construction will tend to shift the horizontal deflection center away from screen 37 as shown in Fig. 3 and will further increase the spacing between the horizontal and vertical windings so as to reduce capacity and losses therebetween.

Figure 4:
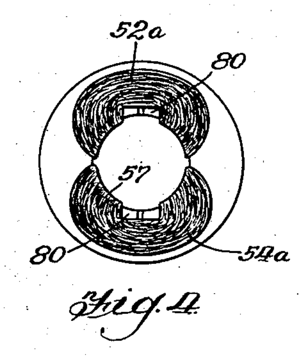
Figs. 4–7 are sectional views along the lines correspondingly indicated in Fig. 1.

To further shift the horizontal deflection center to the rear, the winding portions 52*a* (Fig. 4) at the beam entrance end of the yoke are turned outwardly from the tube neck 57 and spaced from neck 57 forming "windows" 80. Such construction provides lesser restriction of the deflection field at this end of the coil resulting in a further shift of the deflection center. Therefore, by a combination of lengthening the coil 52 and providing windows 80 the desired result is obtained without an undue lengthening of the coil where lengthening coil 52 alone might enlarge the yoke 50 by an undesired amount.

Figure 5:
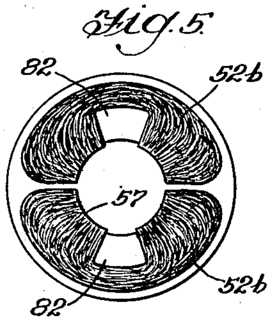
Figure 6:
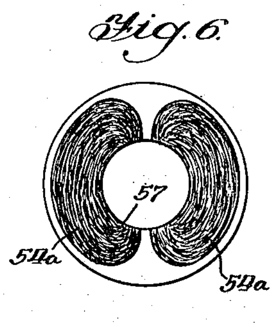

Fig. 6 shows the outwardly turned portions 54*a* of the vertical deflection coils 54 at the beam entrance end of the yoke in which it may be seen there are no windows thus preventing the backward shift of the deflection center of these coils. Figs. 5 and 7 show, respectively, the outwardly turned end portions 52*b* and 54*b* of the horizontal and vertical deflection coils at the beam exit end of the yoke. It may be seen that portions 52*b* and 54*b* are spaced even farther from neck 57 than are portions 52*a* to form relatively large "windows" 82 and 84. This is standard construction and these relatively large "windows" secure advantages which are familiar to those in the art. It should be pointed out that the spacing of the portions 52*b* and 54*b* at the beam exit end of the yoke from the tube neck 57 and relative sizes of windows 82 and 84 could influence the relative horiozntal and vertical deflection centers. For example, making windows 82 in the horizontal deflection coils smaller would tend to shift the deflection center toward the beam entrance end of the yoke. However, for various constructional reasons, it usually is desirable to have windows 82 and 84 of the same size. Accordingly, the shifting of the centers is accomplished as shown, namely by the windows in portions 52*a* at the beam entrance end of the yoke and by lengthening the horizontal deflection coils 52. In the present state of the art, e. g., the cost of altering a coil winding machine to change the size of windows 82 may be far in excess of the "tooling" cost to lengthen coils 52 and/or provide windows 80.

The invention provides, therefore, beam deflection apparatus for a tri-beam color television cathode ray tube useful in a color television receiver which maintains improved registration of the beams upon their respective targets or phosphor dots. The structure modifications over prior art yoke devices are comparatively simple and inexpensively made. Thus, by this deflection apparatus the color purity or proper registration of the electron beam at the extreme edges of the screen in a cathode ray tube may be greatly improved.

I claim:

1. In beam deflection apparatus for a cathode ray tube wherein an electron beam may travel along a beam path to impinge upon various positions of a screen, a yoke including vertical and horizontal beam deflection coils each having respective deflection centers and being adapted to be disposed about the beam path, said coils further being adapted to be coupled to a source of control signals for effecting deflection of the electron beam outwardly from said deflection centers and across the screen, at least one of said deflection coils having an assoicated end flare construction differing from that of the other deflection coil for modifying the field of said one deflection coil and thereby shifting the deflection center thereof with respect to the deflection center of the other deflection coil.

2. Beam deflection apparatus for scanning an electron beam in a cathode ray tube having a tube neck through which the beam passes, including in combination, two sets of deflection coils respectively adapted to produce horizontal and vertical deflection of the electron beam from respective beam deflection centers, one of said sets of coils being of greater length than the other, said sets of deflection coils being adapted to be supported coaxially around the tube neck and being longitudinally displaced with respect to one another, said sets of coils further having corresponding outwardly flared end sections at least two of which corresponding sections are spaced from the tube neck by differing amounts, said flared end sections and the longitudinal displacement of said sets of coils providing alteration of the deflection centers with respect to one another.

3. Beam deflection apparatus for scanning a plurality of electron beams in a cathode ray tube having a tube neck through which the beams pass, and a screen having portions which the beams selectively impinge, including in combination, first deflection coil means adapted to be positioned on the tube neck for deflecting the beams in one direction, said first coil means having winding portions parallel to the tube neck and looped end portions turned outwardly and spaced a certain amount from the tube neck, second deflection coil means adapted to be positioned in the tube neck for deflecting the beams in a direction perpendicular to the aforementioned direction, said second coil means having winding portions parallel to the tube neck and looped end portions with at least one of said portions being spaced differently from the tube neck than the corresponding portion of said first coil means, thereby providing deflection centers shifted with respect to one another as compared to deflection centers provided by the same spacing from the tube neck of corresponding end portions of said first and second deflection coil means.

4. In a beam deflection yoke for a tri-beam cathode ray tube wherein electron beams travel along respective beam paths to impinge selected portions of a screen, the beam deflection coils for such a yoke having predetermined selectable deflection centers including in combination, first inductance coil means adapted to produce a first deflection field across the beam paths and having respective coil winding portions at opposite ends thereof turned outwardly, the winding portion at one end thereof being spaced from the beam path a distance greater than the winding portion at the other end thereof, second inductance coil means adapted to produce a second deflection field in selected relation to said first deflection field and across the beam paths, said second coil means having coil winding portions at opposite ends thereof turned outwardly, such outwardly-turned portions of said second coil-means being disposed adjacent the respective outwardly-turned portions of said first coil means, said outwardly-turned winding portions at one end of the yoke having a different longitudinal spacing therebetween as compared with said outwardly-turned winding portions at the other end of the yoke, whereby the deflection center of said first coil means relative to that of said second coil means is influenced by the spacing of said winding portions of said first coil means from the beam paths and the different spacing of the adjacent winding portions of said first and second coil means.

5. An electron beam deflection yoke for scanning a plurality of electron beams in a cathode ray tube having a tube neck through which the beams pass and a screen selected portions of which the beams impinge, including in combination, a set of horizontal and a set of vertical deflection coils respectively adapted to produce horizontal and vertical deflection of the electron beams from respective beam deflection centers, said sets of deflection coils having a central portion adapted to be occupied by the tube neck and being coaxially disposed with respect thereto, said sets of deflection coils further having corresponding outwardly flared end sections at beam entrance and beam exit ends of said yoke, said flared end sections of said set of horizontal deflection coils at the beam entrance end of said yoke being spaced from said central portion by a greater amount than said flared end sections of said set of vertical deflection coils and said flared end sections of said set of horizontal deflection coils being spaced longitudinally outward of said flared end sections of said set of vertical deflection coils with the spacing at the beam entrance end of the yoke being greater than that at the beam exit end thereof so that the beam deflection center of said set of horizontal deflection coils is shifted with respect to that obtaining with similar spacings of said flared end sections of said sets of deflection coils.

6. In beam deflection apparatus for a tri-beam cathode ray tube wherein a plurality of electron beams may travel along beam paths through entrance and exit ends of the apparatus to impinge upon various selected portions of a screen, the vertical and horizontal deflection coils having respective beam deflection centers and being adapted to be disposed about the beam path and to be coupled to a source of control signals for effecting deflection of the electron beam outwardly from said deflection centers and across the screen, said horizontal deflection coil having portions extending beyond said vertical deflection coil at the beam entrance and exit ends of the apparatus with such portions being of unequal size to influence the deflection center of one coil with respect to the deflection center of the other so that the angles of beam impingement on the screen may be independently fixed.

References Cited in the file of this patent

UNITED STATES PATENTS

| | | |
|---|---|---|
| 2,157,182 | Maloff | May 9, 1939 |
| 2,570,425 | Bocciarelli | Oct. 9, 1951 |
| 2,616,056 | Thalner | Oct. 28, 1952 |
| 2,617,059 | Neeteson | Nov. 4, 1952 |
| 2,704,816 | Fernsler | Mar. 22, 1955 |
| 2,793,311 | Thomas | May 21, 1957 |